United States Patent [19]
Whitehead et al.

[11] Patent Number: 5,222,873
[45] Date of Patent: Jun. 29, 1993

[54] FLUID-DRIVEN RECIPROCATING APPARATUS AND VALVING FOR CONTROLLING SAME

[75] Inventors: John C. Whitehead, Davis, Calif.; Hans G. Toews, East Aurora, N.Y.

[73] Assignee: The United States of America as represented by the United States Department of Energy, Washington, D.C.

[21] Appl. No.: 901,290

[22] Filed: Jun. 19, 1992

[51] Int. Cl.$^5$ ............................................. F04B 35/02
[52] U.S. Cl. .................................... 417/344; 417/426; 60/39.48; 137/596.18; 91/189 A; 91/193
[58] Field of Search ...................... 417/344, 346, 426; 137/596.18; 91/189 R, 189 A, 191, 193; 60/39.462, 39.48, 259; 92/240

[56] References Cited

U.S. PATENT DOCUMENTS

| | | | |
|---|---|---|---|
| 3,524,714 | 8/1970 | Grove et al. | 417/349 |
| 4,021,156 | 5/1977 | Fuchs, Jr. et al. | 417/346 |
| 4,490,096 | 12/1984 | Box | 417/344 |
| 4,541,640 | 9/1985 | Tregonning | 92/240 |
| 4,714,411 | 12/1987 | Searle | 417/246 |
| 4,722,183 | 2/1988 | Rosen | 60/204 |
| 4,894,986 | 1/1990 | Etheridge | 60/258 |
| 5,026,259 | 6/1991 | Whitehead et al. | 417/379 |

OTHER PUBLICATIONS

AIAA 91-1837, Free Piston Pumps for Miniature Rocket Propulsion, John C. Whitehead, 27th Joint Propulsion Conference, Jun. 24-26, 1991.
A Lightweight Pumped Hydrazine Maneuvering Vehicle, UCRL-JC-109568, John C. Whitehead, 1992 JANNAF Propulsion Meeting, Feb. 24-27, 1992.

*Primary Examiner*—Richard A. Bertsch
*Assistant Examiner*—Charles G. Freay
*Attorney, Agent, or Firm*—Henry P. Sartorio; Roger S. Gaither; William R. Moser

[57] ABSTRACT

A control valve assembly for alternately actuating a pair of fluid-driven free-piston devices by using fluid pressure communication therebetween. Each control valve is switched by a pressure signal depending on the state of its counterpart's piston. The communication logic is arranged to provide overlap of the forward strokes of the pistons, so that at least one of the pair will always be pressurized. Thus, uninterrupted pumping of liquid is made possible from a pair of free-piston pumps. In addition, the speed and frequency of piston stroking is entirely dependent on the mechanical power load applied. In the case of a pair of pumps, this enables liquid delivery at a substantially constant pressure over the full range of flow rates, from zero to maximum flow. One embodiment of the invention utilized two pairs of fluid-driven free-piston devices whereby a bipropellant liquid propulsion system may be operated, so as to provide continuous flow of both fuel and oxidizer liquids when used in rocket applications, for example.

35 Claims, 10 Drawing Sheets

FLUID-DRIVEN RECIPROCATING APPARATUS AND VALVING FOR CONTROLLING SAME

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to a fluid-driven apparatus, such as a free-piston system, for applications including liquid rocket propulsion, particularly to a control valve assembly for fluid-driven free-piston devices, and more particularly to a valve assembly for each reciprocating device of an associated pair of such devices so that the devices are alternately actuated by using fluid pressure communication therebetween.

Liquid rocket propulsion requirements have historically fallen into two distinct categories, which correspond to two different aerospace applications. The first kind of requirement is for performance-oriented rocket stages which deliver high levels of thrust continuously with large total impulses, typically use for launch vehicles. High performance is achieved through the use of rotating propellent pumps driven by turbines, which permits high-pressure propellant delivery from relatively lightweight tankage at low pressure. The second kind of requirement is for relatively small propulsion systems, which must reliably provide thrust on demand over periods of many years. The main application of the small systems is orbital maintenance, so performance has been much less important than long-term reliability for this second kind of propulsion system. Hence, satellite liquid propulsion systems have been pressure-fed. Advantages of avoiding pumps are overall simplicity and the lack of moving seals which could wear and permit propellant leakage losses during long periods of inoperation. Perhaps more importantly, turbopumps cannot support short thrust pulses, since it requires time at reduced efficiency for turbomachinery to start and stop.

Recently, there has been interest in developing technology for increasing the performance capabilities of small rocket propulsion systems which thrust intermittently. For example, electrically-driven rotating pumps for possible use on satellites have been demonstrated. An approach for high thrust missions has been to increase the performance of pressure-fed operation, by using state-of-the-art materials technology for otherwise mass-intensive pressurant vessels and high pressure liquid tankage.

An alternative small propulsion system has been demonstrated that uses low pressure tankage and free-piston pumps which can start and stop rapidly to meet a demand-thrust requirement. These pumps are driven by a gas source. Free-piston devices are positive displacement fluid power machines which undergo reciprocating motion, without mechanical power transfer, such as a connecting rod to a rotating crankshaft. Earlier applications of the free-piston devices were steam-driven air compressors, compressors driven directly by oscillating electromagnetic fields and hydraulic or gas-driven intensifiers. These prior applications generally used a relatively slow-moving differential free-piston to amplify pressure. In contrast, the free-piston pump for small propulsion systems must operate as a high volume flow device, with a high power-to-weight ratio, as well as being a pressure amplifier. U.S. Pat. No. 5,026,259, issued Jun. 25, 1991, in the name of John C. Whitehead et al., exemplifies the use of free-piston devices for propulsion systems used for attitude control or maneuvering.

While gas-driven free-piston pumps can operate at any flow rate, prior known propulsion systems using free-piston pumps have been unable to provide continuous flow of either monopropellant or bipropellant for rocket systems without complicated electrical control systems. Thus, there has existed in the small rocket propulsion systems a need for a valve control system which provides for rapid response, as well as continuous liquid delivery for steady thrust.

The present invention fills this prior recognized need by providing a valve control assembly which alternately actuates a pair of fluid-driven pumps, using fluid pressure communication between them. Each control valve of one of a pair of pumps is switched by a pressure signal depending on the state of its counterpart's pump piston. The communication logic is arranged to provide overlap of the forward strokes of the pistons, so that at least one of the pair of pumps will always be pressurized. Thus, uninterrupted pumping of liquid is made possible from a pair of free piston pumps. In addition, the speed and frequency of piston stroking is entirely dependent on the mechanical power load applied. In the case of a pair of pumps, this enables liquid delivery at a substantially constant pressure over the full range of flow rates, from zero to maximum flow.

The present invention has application for both monopropellant liquid propulsion systems and for bipropellant liquid propulsion systems, each utilizing reciprocating pumps. For the bipropellant system, a total of four pumps enables continuous flow of both fuel and oxidizer liquids, while allowing a different flow rate of each of the different liquids utilized. Also, a new oxidizer pump for the bipropellant system is provided.

SUMMARY OF THE INVENTION

It is an object of the present invention to provide a valve control arrangement for a reciprocating system.

A further object of the invention is to provide a pump system utilizing at least one pair of fluid-driven pumps and a control valve assembly whereby uninterrupted pumping of liquid is made possible.

A still further object of the invention is to provide a pressure actuated control valve assembly which is small and light weight while having a high fluid throughput capacity.

A still further object of the invention is to provide a valve assembly which utilizes alternating concentric layers of metal and graphite for low-friction operation, while permitting thermal expansion.

A still further object of the invention is to provide automatically oscillating valving for a pair of cylinders which work at any pressure because no springs are used.

A still further object of the invention is to provide a liquid propulsion system using at least one pair of free-piston pumps, each pump having a control valve which is pressure actuated by the other pump.

Another object of the invention is to provide at least one pair of free-piston pumps, each provided with a three-way control valve, such that the pumps are alternatively actuated by using fluid pressure communication therebetween.

Still another object of the invention is to provide a fluid-driven reciprocating pump system for either monopropellent or bipropellant liquid propulsion system.

A still further object of the invention is to provide an oxidizer pump and control valving for bipropellant liquid propulsion systems.

Other objects and advantages of the invention will become apparent from the following description and accompanying drawings.

Briefly, the invention involves the use of control valves operating in pairs, each valve being operatively connected to actuate a reciprocating pump device. Each pair of control valves are interconnected to alternately actuate their associated pumps by using fluid pressure communication between the control valves. Each control valve is switched by a pressure signal depending on the state of its counterparts pump piston. The control valve/reciprocating pump arrangement of the present invention may be effectively utilized for both monopropellant and bipropellant liquid propulsion systems. For the bipropellant system, two pair of control valve/pump arrangements are used, one for the fuel and one for the oxidizer, in which the oxidizer pump control valves may be slaved to the fuel pump control valves for synchronous operation. Also disclosed is a oxidizer pump for the bipropellant system which uses a single bellows and no sliding seals instead of a differential area piston, since oxidizer pumps do not need to have a pressure boost ratio (from warm gas pressure to liquid pressure) as is required for the liquid fuel in order to bootstrap the propulsion system from low tank pressure to a higher operating pressure.

BRIEF DESCRIPTION OF THE DRAWINGS

The accompanying drawings, which are incorporated into and form a part of the specification, illustrate embodiments of the invention and, together with the written description, serve to explain the principles of the invention.

DETAILED DESCRIPTION OF THE INVENTION

The present invention is generally directed to pump and valving arrangements for small monopropellant or bipropellant liquid propulsion systems which use low pressure tankage and reciprocating pumps which can start and stop rapidly to meet a demand-thrust requirement. More specifically, the invention is directed to a control system for a pair of free-piston pumps which utilize a three-way valve operatively connected to each pump and interconnected so as to have fluid pressure communication therebetween. The control valve arrangement of the present invention permits rapid switching between intake and exhaust of the pump, in addition to providing large cross sectional areas for the flows with a short poppet stroke and minimal hardware mass and size.

In liquid rocket propulsion, pumps are needed to achieve the highest performance by pumping fuel stored at low pressure to the thrust chambers at high pressure, thus reducing structural mass by minimizing the volume of highly-pressurized parts. In a free-piston pump, there is no crankshaft from which valve-timing information can be mechanically obtained, yet for control it is necessary to actuate the intake and exhaust valving with a precise dependence on piston position. In applications, such as liquid rocket propulsion, there is a need for continuous liquid delivery capability for steady thrust, but also with immediate start and stop capability.

Thus, the present invention is a means to alteratively actuate at least one pair of fluid-driven free-piston pumps or reciprocating devices, by using fluid pressure communication between them. Each free-piston pump is provided with a three-way control valve, and each control valve is switched by a pressure signal depending on the state of its counterparts' piston. The communication logic between the control valves is arranged to provide overlap of the forward strokes of the pistons of the pumps, so that at least one of the pair of pumps will always be pressurized. Thus, uninterrupted pumping of liquid is made possible from a pair of free-piston pumps. In addition, the speed and frequency of piston stroking is entirely dependent on the mechanical power load applied. In the case of a pair of pumps, this enables liquid delivery at a substantially constant pressure over the full range of flow rates, from zero to maximum.

Figure 1:
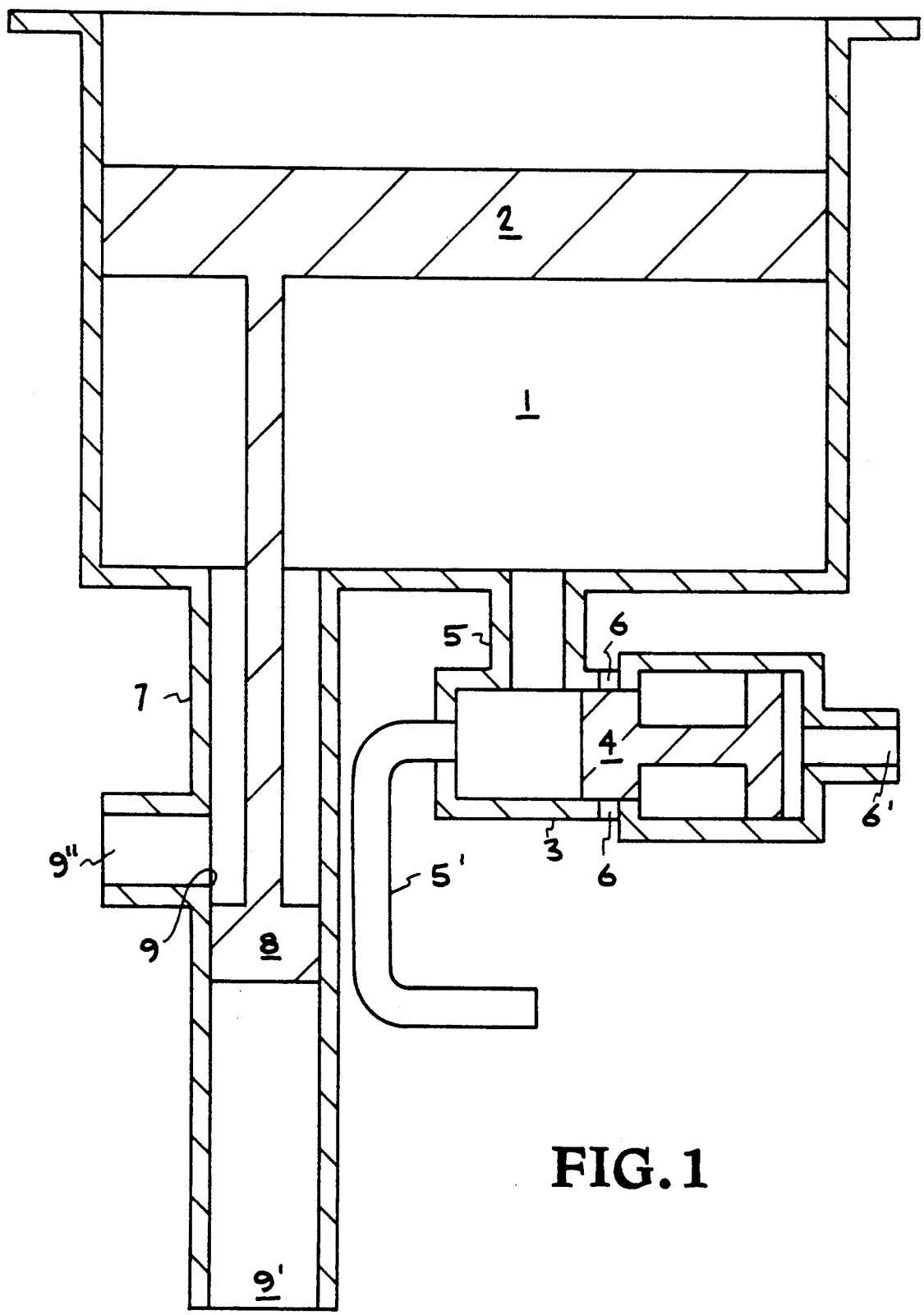
FIG. 1 schematically illustrates the basic features of the present invention.

Referring now to the drawings, FIG. 1 schematically illustrates the basic features of the present invention. Apparatus of FIG. 1 comprises a cylinder 1 defining therein a working chamber within which is a partition or movable member 2. Connected to the cylinder 1 is an intake/exhaust control valve assembly 3 having therein a double-headed pressure actuated piston 4 which uncovers/covers a common intake/exhaust port 5 and exhaust ports 6. Also connected to cylinder 1 is a signal valve assembly 7 having a piston 8 connected to movable member 2, piston 8 covering or uncovering a signal port 9 depending on the location of movable member 2 with in cylinder 1. Signal valve assembly 7 also includes a signal vent port 9'. Connected to valve assembly 3 on the side thereof adjacent intake port 5 is an intake line 5' connected to a supply fluid source, not shown, while a control line 6' is connected on the side of valve assembly 3 adjacent exhaust ports 6 and is connected to a control fluid source, not shown. Connected to signal port 9 is a signal output line 9".

With the pistons 4 and 8 of respective valve assemblies 3 and 7 positioned as shown in FIG. 1, supply fluid via line 5' is directed into the working chamber of cylinder 1 moving the member 2 inwardly (toward the top as shown), and the signal line 9" is in open communication with the chamber of cylinder 1. As the member 2 continues to move inwardly in cylinder 1, piston 8 of signal valve assembly 7 passes port 9 and connects signal line 9" with signal vent 9'. While not shown, signal line 9" of one of a pair of apparatus illustrated in FIG. 1 is connected to control line 6' of another of a pair of pump-/valve assemblies (not shown), and vice-versa. Thus, when the signal line 9" is vented, the pressurized signal line 9" of the companion apparatus is connected to control line 6', whereby piston 4 is moved (to the left as shown) past intake port 5 such that fluid from the chamber of cylinder 1 is exhausted via ports 6, thereby allowing movable member 2 to return or move outward (move toward the bottom as shown). Outward movement of member 2 causes signal piston 8 to move outward, thus reconnecting signal line 9 with the chamber of cylinder 1.

The essence of the switch logic basically described above with respect to FIG. 1 and described in greater detail hereinafter with respect to FIG. 4, includes the following features:

1. Supply fluid enters the working chamber in absence of control pressure.
2. Control pressure causes the working chamber to be vented.
3. Signal output line is connected to the working chamber when the chamber is not full.
4. Signal output line is vented when the working chamber is nearly full.
5. Paired apparatus having the above features with the signal output line of each one connected to the control line or port of the other.
6. Apparatus will oscillate at any supply pressure due to absence of springs (which restrict operation to particular forces and pressure levels), since operation over a wide pressure range is important for bootstrapping, in a propulsion system.

Figure 2:
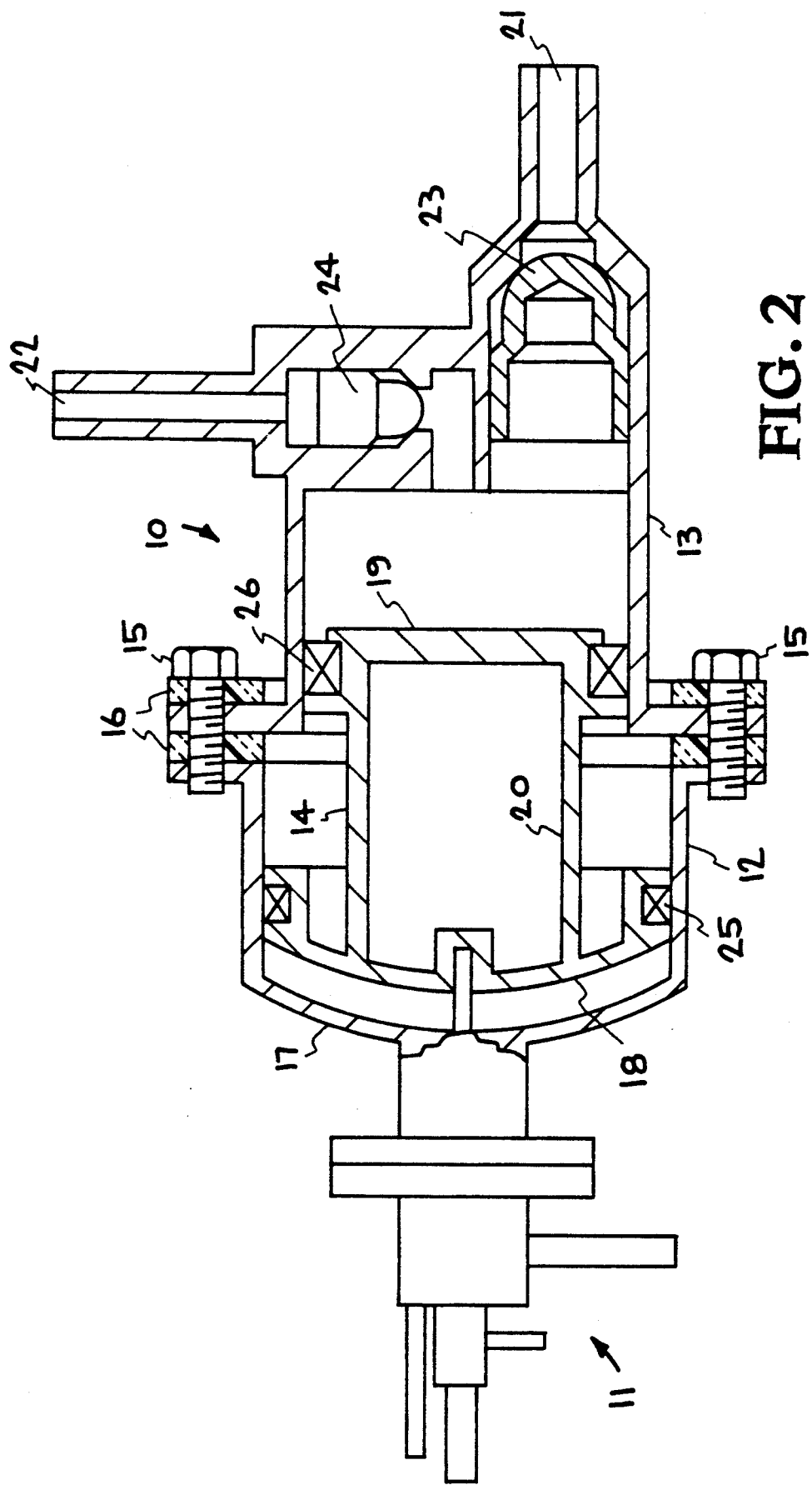
FIG. 2 is a cross-sectional view of an embodiment of a free-piston pump/control valve arrangement of the present invention.

While the upper or inward end of cylinder 1 of FIG. 1 is shown as being open, it can be connected to inlet and outlet check valves as shown in FIG. 2 for pumping applications, or to a plenum for pressurizing same. Also, the partition or movable member 2 of FIG. 1 may be connected to an oscillating mechanism, whereby a pair of such apparatus would alternately oscillate he mechanism.

Figure 3:
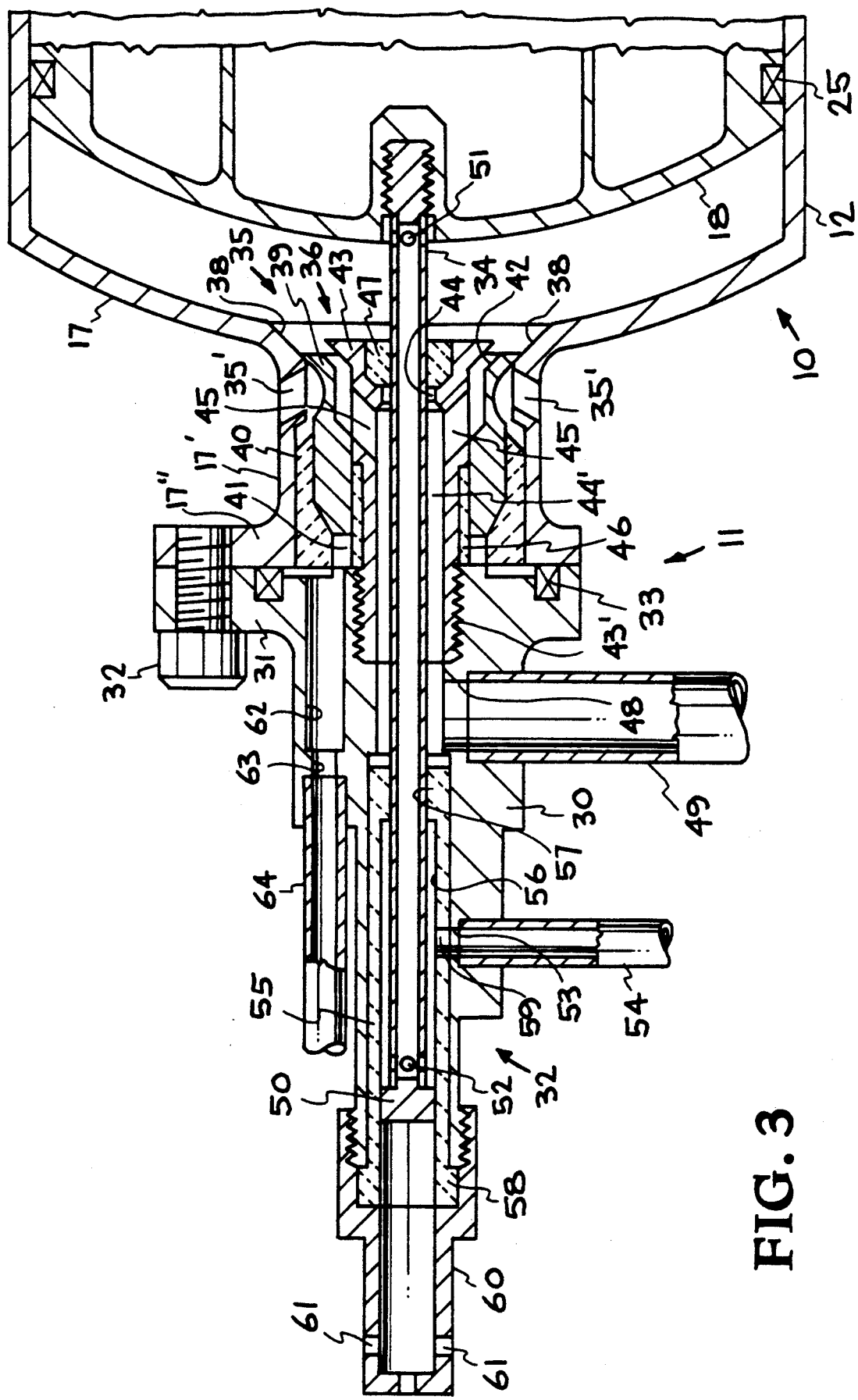
FIG. 3 is an enlarged view of an embodiment of the three-way control valve of the FIG. 2 embodiment.

FIG. 2 illustrates an embodiment of a fluid-driven free-piston pump to which is attached a three-way control valve assembly, with the valve assembly being illustrated in detail by the FIG. 3 embodiment. The apparatus of FIG. 2 basically comprises a fluid-driven free-piston pump assembly generally indicated at 10 and a gas intake/exhaust valve assembly generally indicated at 11. The valve assembly 11 is illustrated in detail in FIG. 3 and is constructed so that the valving occurs at the cylinder head of pump assembly 10 thereby eliminating non-working volume.

The fluid-driven free-piston pump assembly 10 basically includes a fluid or gas cylinder 12 a liquid cylinder 3, a differential area free-piston generally indicated at 14 moveably mounted in cylinders 12 and 13, with cylinders 13 and 13 interconnected by bolts 15 and insulting washers 16. The valve assembly 11 is mounted in a head portion 17 of fluid or gas cylinder 12. Differential area free-piston 14 includes a larger cross-section curved head or face section 18 located in gas cylinder 12 and a smaller cross-section flat head or face section 19 located in liquid cylinder 13, with heads 18 and 19 interconnected by a shaft section 20. For example, the stroke of piston 14 may be 1.27 cm (0.50 inch), and the bore diameters of cylinders 12 and 13 may be 3.18 cm (1.25 inch) and 2.54 cm (1.00 inch), respectively, resulting in gas and liquid displacements of 10.0cm$^3$ and 6.44cm$^3$, and a piston area ratio of 1.56. Connected to liquid cylinder 13 is a liquid inlet 21 and a liquid outlet 22, each provided with check valves 23 and 24 respectively. By way of example, the fluid or gas cylinder 12 is constructed of a nickel alloy or titanium and the liquid cylinder 13 is constructed of aluminum. The gas cylinder 12 may have a wall thickness of 0.020 inch, with the head portion 17 having a thickness of 0.035 inch., while the liquid cylinder 13 may have a wall thickness of 0.030 inch. The piston head 18 and shaft section 20 may be constructed of a nickel alloy or titanium, with piston head 19 being constructed of aluminum. Piston heads 18 and 19 are provided with seal assemblies 25 and 26 respectively, and are constructed to withstand the composition, pressures, and temperatures of the gas and liquid in the respective cylinders 12 and 13. Check valves 23 and 24 are of a cylindrical poppet type having a hemispherical end, which seals against the edge of holes (inlet 21 and outlet 22) machined into a cylinder head 27 of liquid cylinder 13.

The above description of the fluid-driven free-piston pump assembly 10 is believed sufficient to enable one skilled in the art to understand the various components thereof. However, for greater detail of each of the components of pump assembly 10, attention is directed to coapplicant's paper entitled "Free Piston Pumps For Miniature Rocket Propulsion", AIAA91-1837, John C. Whitehead, 27th Joint Propulsion Conference, Sacramento, CA, Jun. 24-26, 1991 which is incorporated herein by reference thereto.

An embodiment of the gas intake/exhaust valve assembly 11 of FIG. 2 is illustrated in detail in FIG. 3, and attached to the head portion 17 of pump assembly 10 so as to eliminate non-working volume between the valve and the gas cylinder of the apparatus. The overall operation of valve assembly 11 of FIG. 3 will be more fully understood from the description hereinafter of FIG. 4 which utilizes a pair of interconnected valve assemblies mounted on a pair of pump assemblies of the type illustrated in FIG. 2. As seen in FIG. 3 the fluid or gas cylinder head 17 of pump assembly 10 includes a protruding section 17' and a flange section 17" to which a valve body 30 of valve assembly 11 is secured via a flange section 31 thereof by bolts 32 (only one shown).

Valve body 30 is provided with a central opening extending longitudinally therethrough. Thus, it is seen that the head 17 of gas cylinder 12 has been designed with an integral, remotely-piloted three-way intake/exhaust valve to run the pump assembly 10, which includes a signal valve, actuated by the pump via a hollow stem or shaft 34 secured to gas piston head 18, to pilot its partner pump's intake/exhaust valve (see FIG. 4).

The valve assembly 11 basically comprises three valve sections generally indicated at 35, 36 and 37, with poppet valve sections 35 and 36 being located adjacent to gas cylinder head 17 and signal valve section 37 located remotely therefrom and actuated by stem 34 secured to piston head 18. Cylinder head section 17' is provided with a plurality of exhaust ports 35' and a surface forming an exhaust valve seat 38 for a movable valve member 39 of poppet valve 35. A high density graphite seal 40 is located around valve member 39 and is adapted to move with member 39 as it moves with respect to seat 38, and seal 40 being secure (as by pressing) to valve member 39. An empty space or area 41 is located behind valve member 39. Valve member 39 includes an inner surface thereof forming a valve seat surface 42 for a fixed valve member 43 of poppet valve 36. Valve member 43 extends through a central opening in valve member 39 and is secured in the central opening in valve body 30, such as by threads 43', and has a central opening 44 through which extends stem 34 of signal valve 37 and is provided with a plurality of intake openings 45. A high density graphite seal 46 is located intermediate valve member 39 and valve member 43, and a high density graphite seal 47 is located intermediate valve member 43 and stem 34. Central opening 44 includes an enlarged diameter section 44' which is in open communication with intake openings 45 of valve member 43 and with an inlet opening 48 in valve body 30 which is connected to a gas supply tube or line 49. It is thus far apparent that gas cylinder 12 of pump assembly 10 will be in communication with either exhaust ports 35' or with intake openings 45 depending on the position of valve members 39 and 43 with respect to their seats 38 and 42. Signal valve 37 includes hollow stem 34 which is connected at an inner end to piston head 18, extends through the central opening in valve member 43 and the control opening in valve body 30, and closed at the outer end by plug or head 50. Adjacent each of the ends of hollow stem 34 are a plurality of sets of openings 51 and 52 (four each, one shown) the combined area of openings sets 51 and 52 at each end is equal to or greater than the area of hollow steam 34 so as to allow unrestricted flow through stem 34. Stem 34 of signal valve 37 need not be hollow, but could be solid if a separate tube is used for communicating pump cylinder pressure to the signal valve. Valve body 30 is provided with a signal output port 53 connected to a tube or line 54 which, as seen in FIG. 4, extends to a partner pump's control port. A high density graphite seal 55 is located in the outer section of the central opening of valve body 30 and extends around an outer end section of hollow tube 34 and plug 50. Seal 55 includes a central section 56, an inwardly protruding inner section 57, an outwardly protruding outer section 58, and an opening 59, such that inner section 57 is in sealing relation with stem 34, outer section 58 is in sealing relation to an end cap 60 secured to valve body 30, central section 56 is in sealing relation with plug 50, and opening 59 is in fluid communication with port 53 in valve body 30. It is thus seen that as shown in FIG. 3 there is fluid communication between line 54 and gas cylinder 12 via signal port 53, opening 59, central section 56 of seal 55, openings 52, hollow stem 34 and openings 51. End cap 60 is provided with a plurality of openings or vents 61 which function as a signal valve vent when signal valve stem 34 is moved to the right as shown in FIG. 3 so that plug 50 passes opening 59 in seal 55 to provide fluid communication between line 54 and vents 61. Valve body 30 is provided with a longitudinally extending passageway or opening 62 which interconnects a control port 63 and poppet valve 35, a line 64 interconnecting port 63 with the signal port (similar to signal port 53) of partner pump's signal valve, as seen in FIG. 4.

The operation of the FIG. 3 valve will be described in detail hereinafter with respect to the description of FIG. 4. Also, it is noted that the FIG. 3 embodiment is generally similar to the intake/exhaust valve illustrated and described in co-applicant's above-reference paper AIAA91-1837, with the primary difference being in the construction, configuration, and location of the graphite seals. The seals of the FIG. 3 embodiment have elevated temperature operation capabilities, and are constructed of high density graphite. Note that the FIG. 3 embodiment provides alternating concentric layers of metal and graphite which provide for low-friction operation, while permitting thermal expansion of the valve mechanism without seizing or sticking of the moving parts of the valve. All sliding interfaces have metal on one side and graphite on the other side to prevent abrasive failure of the valve. At the larger sliding interfaces, graphite is the inside layer and metal is the outside layer. Since metal has a higher thermal coefficient of expansion than graphite, this arrangement ensures that the hotter inner part of the sliding interface does not expand thermally and seize against the outer part of the sliding surface. Conversely, the larger static interfaces are designed with metal on the inside and graphite on the outside, so that the differential expansion tends to tighten, rather than loosen, static interfaces.

It can be readily seen that the valve illustrated in FIG. 3, permits three-way valving operation for rapid switching between intake and exhaust, in addition to providing large cross-sectional areas for the flows with a short poppet stroke and minimal hardware mass and size.

Figure 4:
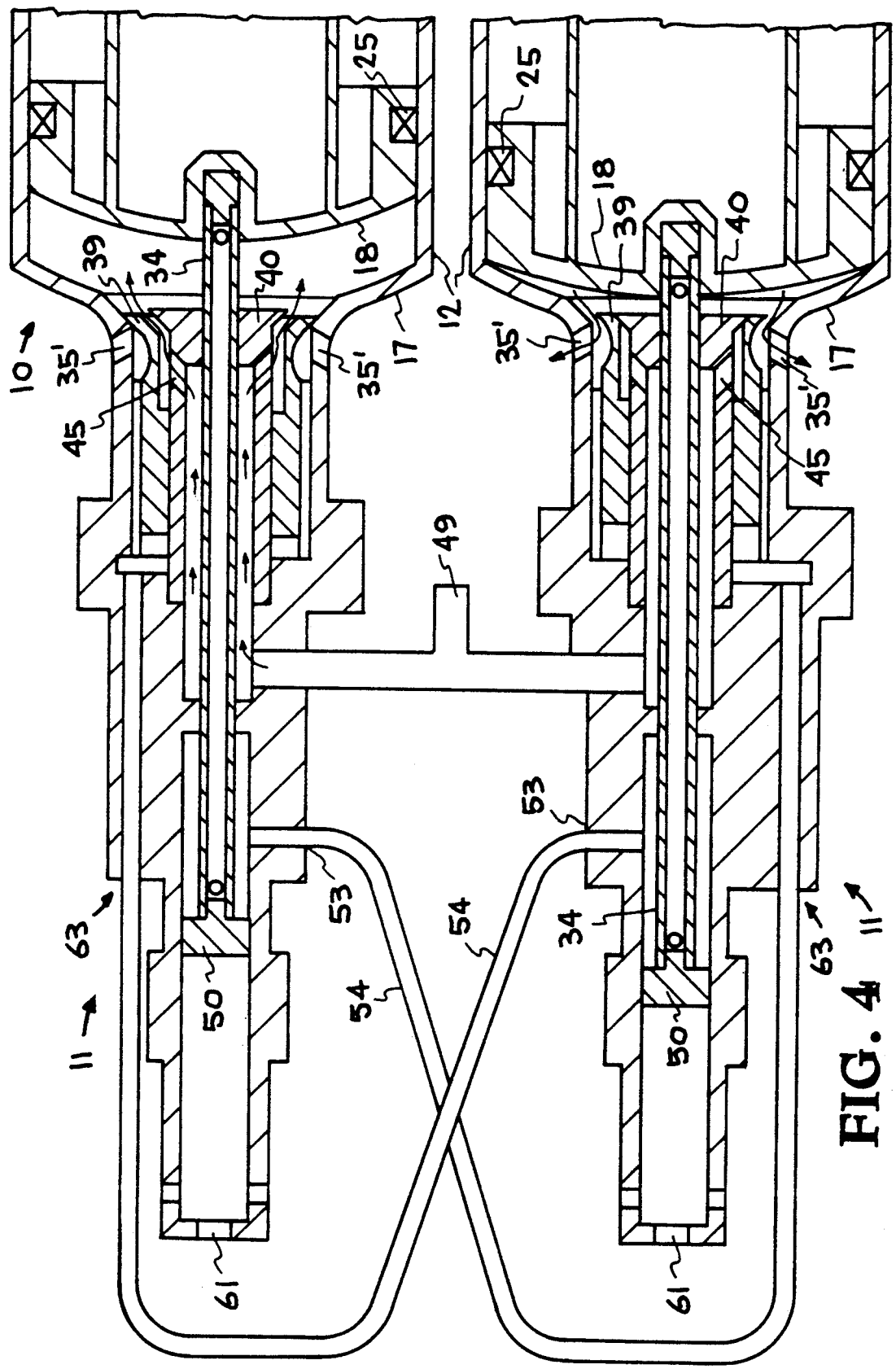
FIG. 4 illustrates an embodiment utilizing a pair of free-piston pumps and associated three-way control valves interconnected in accordance with the invention.
Figure 4A:
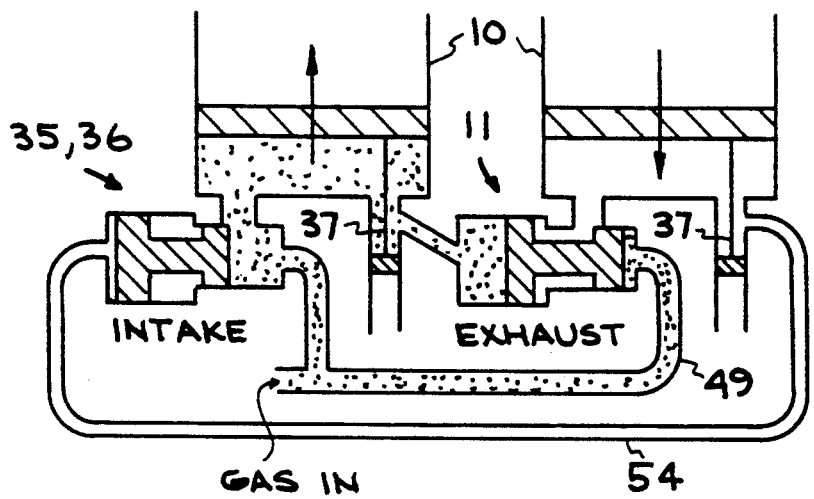
FIGS. 4A-4F schematically illustrates the pneumatic switching of the pump valves.
Figure 4B:
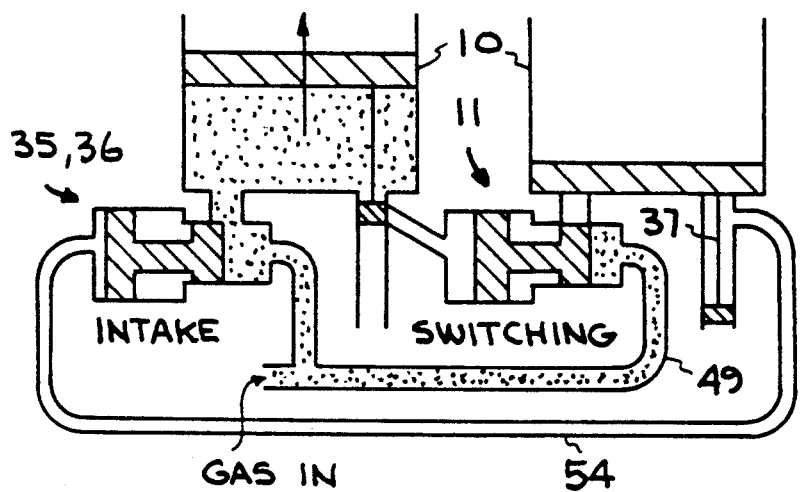
Figure 4C:
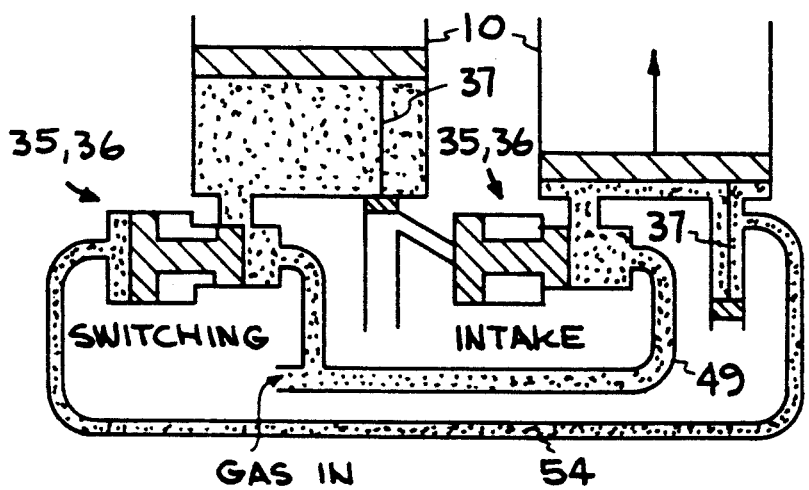
Figure 4D:
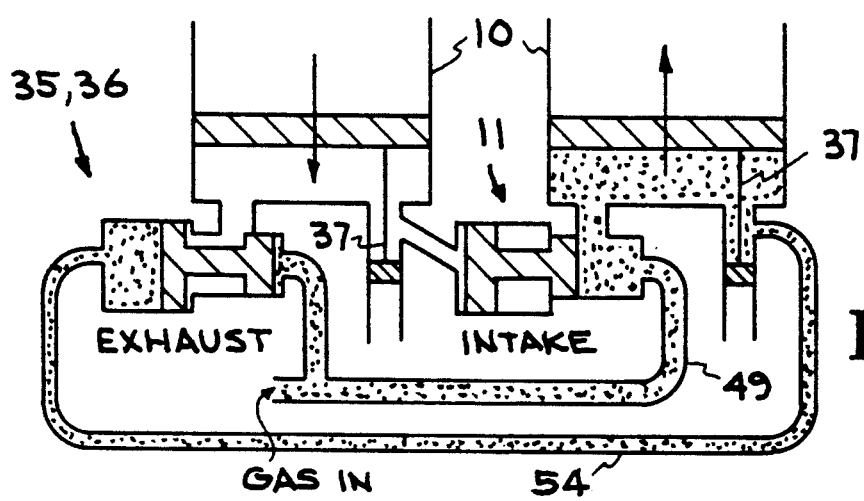
Figure 4E:
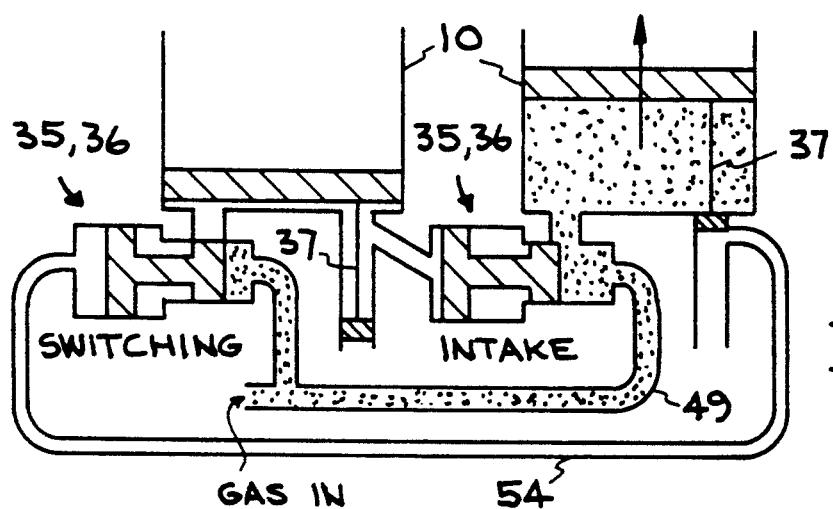
Figure 4F:
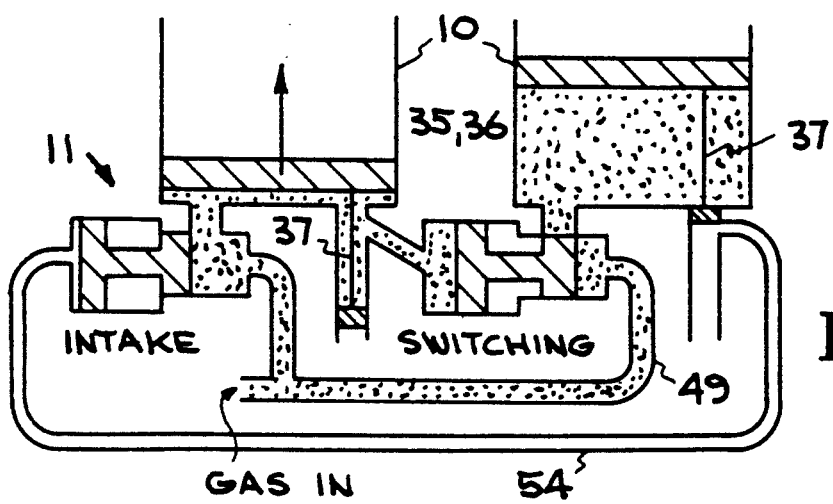
Figure 5:
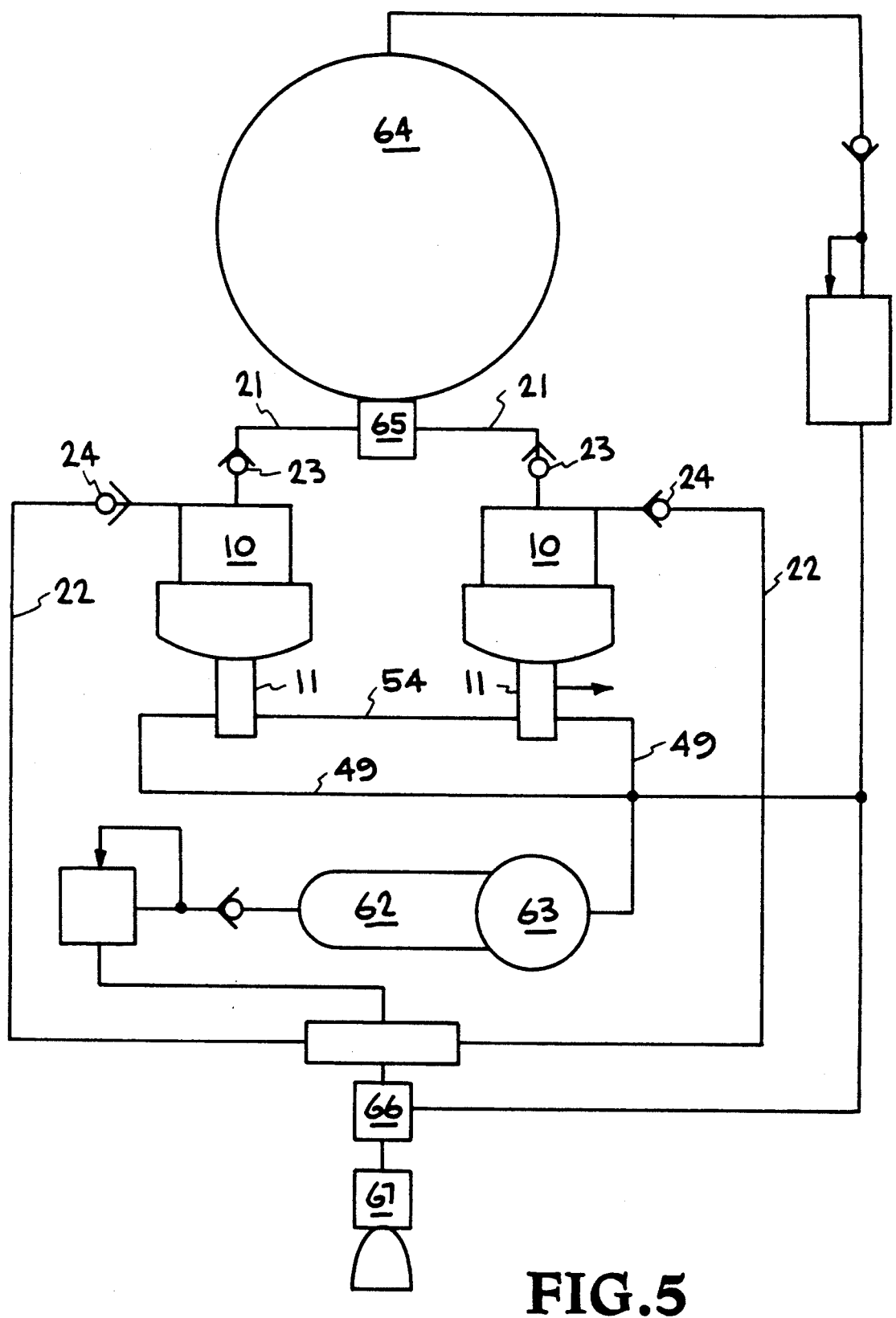
FIG. 5 schematically illustrates a propulsion system utilizing the free-piston pump/control valve arrangement of the present invention.

As set forth above, and as shown in FIG. 5, the dual pump/valve arrangement of FIG. 4 is of particular interest for use in liquid propulsion systems. As described above with respect to FIG. 3 and as illustrated and described with respect to FIG. 4, the warm gas intake/exhaust three-way valves involve a main poppet and valve seats configured so that the valving occurs at the cylinder head to eliminate non-working volume. To provide for three-way operation, the movable poppet is an annular piece within stationary concentric intake and exhaust seats. The left pump is shown with its intake open, and the right pump's exhaust is open. The valve bodies have external vent holes just behind the exhaust seats, so the pump gas cylinders vent rapidly when the exhausts are open. The supply gas flows axially near the center of the valve toward the intake seat. The poppet and intake seat piece are shaped so that any supply pressure will tend to open the intake and close the exhaust by moving the poppet downward in FIG. 4. This feature permits the bootstrap start of the propulsion system shown in FIG. 5.

For passive demand-thrust operation of the propulsion system after startup, the valve assemblies must operate so that at least one pump assembly is pressurized and ready to deliver liquid whenever a thrust control valve (see FIG. 5) is opened. Therefore, the warm gas intake ports of the valve assemblies must open alternately with positive overlap. A pump assembly which is nearing the end of its stroke should be exhausted just after the other's intake opens, so it can refill immediately. These conditions are in Table I.

TABLE I

| PUMP/VALVE CONTROL LOGIC | | |
|---|---|---|
| Condition of First Pump | | Desired State of Second Pump |
| 1. begin pumping | (pressurized) | open exhaust |
| 2. stroking forward | (pressurized) | hold exhaust open |
| 3. near full stroke | (pressurized) | open intake |
| 4. refilling | (vented) | hold intake open |

As seen from Table I, during the first, second and fourth conditions listed, the first and second pump assemblies have opposite states of pressurization. Therefore, the pneumatic signal lines connecting the two-valve assemblies are arranged so that pressure in a pump assembly's gas cylinder simply pushes the other pump assembly's poppet into the exhaust position. However, to accommodate the third condition in Table I, this pressure signal is shut off when the pump assembly's piston is near the end of tis forward stroke. The pneumatic switching sequences will be set forth in greater detail hereinafter.

In FIG. 4 the reference numbers for each of the components of the two pump assemblies and the two valve assemblies will be the same as those in FIGS. 2 and 3, and the two pump assemblies and valve assemblies will be referred to as the left or right assembly as viewed in FIG. 4. In FIG. 4 the left pump assembly 10 is pressurized and has stroked partially. Warm fluid or gas from the pump cylinder 12 is also pressurizing the inside of the signal valve stem 234 which passes to the lower end of valve 37 where the pressure signal switching takes place. While the left pump assembly 10 is stroking, as shown, pressure fluid in the signal stem 34 is communicated to the signal output port 53, through tube or line 54 to the control port 63 of the right valve assembly 11. This pressure fluid passes into space or area 41 and acts on the lower or rear face of poppet valve member 39, which along with seal 40 has a larger area than the upper or front part of member 39 which is exposed to supply pressure. Therefore, the right side poppet valve member 39 is held open in the exhaust position while the left side pump assembly is stroking, as shown by the exhaust arrow on the right side and the inlet arrow on the left side of the apparatus. The signal tube 54 from the right pump assembly 10 to the left pump assembly is vented, because the right pump cylinder is vented. Therefore, there is no pressure acting on the lower face of the left poppet valve member 39, and it remains in the intake position, as indicated by the intake arrow.

When the left pump assembly nears the end of its pumping stroke, the outer or lower end of stem 34 will be moved upwardly such that head or plug 50 is above the signal output port 53. This cuts off the pressure signal from the left pump cylinder, and then vents the signal tube 34 since the space below the head 50 is exposed to the outside through the signal vents 61. The valve assembly on the right is thus signalled to open its intake 45, which pressurizes the right pump cylinder 12, and sends a return pressure signal to the left pump assembly which causes it to exhaust and refill, as described above. Note that the first (left) pump assembly cannot exhaust itself upon nearing the end of its inward (upward as shown) stroke, until the second (right) pump assembly is pressurized. This operational feature guarantees the positive overlap which results in uninterrupted propellant flow in the propulsion system, as illustrated in FIG. 5. The pneumatic switching of the pump valve assemblies of both FIGS. 4 and 5 is schematically illustrated in FIGS. 4A–4F in which the sequence of operation is illustrated by the steps or stages A through F. Corresponding reference numbers to those of FIG. 4 are used in FIGS. 4A–4F.

FIG. 5 schematically illustrates an application of the invention in a free-piston pumped monopropellant demand-thrust propulsion system. Similar reference numerals indicate similar components of the FIGS. 2 and 4 embodiments of the inventions. The warm gas directed into the gas cylinder of pump assemblies 10 via supply line 49 is generated by a gas or fluid generator 62 having a storage plenum 63 to which is connected the warm gas supply line 49. The propulsion liquid fuel (hydrazine) is stored in a low pressure, light weight spherical tank 64 which is connected via an enable valve 65 to liquid inlet lines 21 (see FIG. 2) of pump assemblies 10. The liquid from tank 64 is adapted to flow via alternately activated check valves 23 into the liquid cylinder 13 of either the left or the right pump assembly 10 when the gas cylinder 12 is being exhausted via exhaust ports 35'. As the gas cylinder 12 is stroked (differential free-piston 14 moves upwardly) the liquid is pressurized and forced from the liquid cylinder 13 via check valve 24 into liquid outlet line 22 connected to a thrust control valve 66 and the liquid is then reacted in thrust chamber 67. It is pointed out that the details of the FIG. 5 propulsion system do not constitute part of the present invention, but illustrate an application for the invention as described and illustrated in FIGS. 2 and 4.

Figure 6:
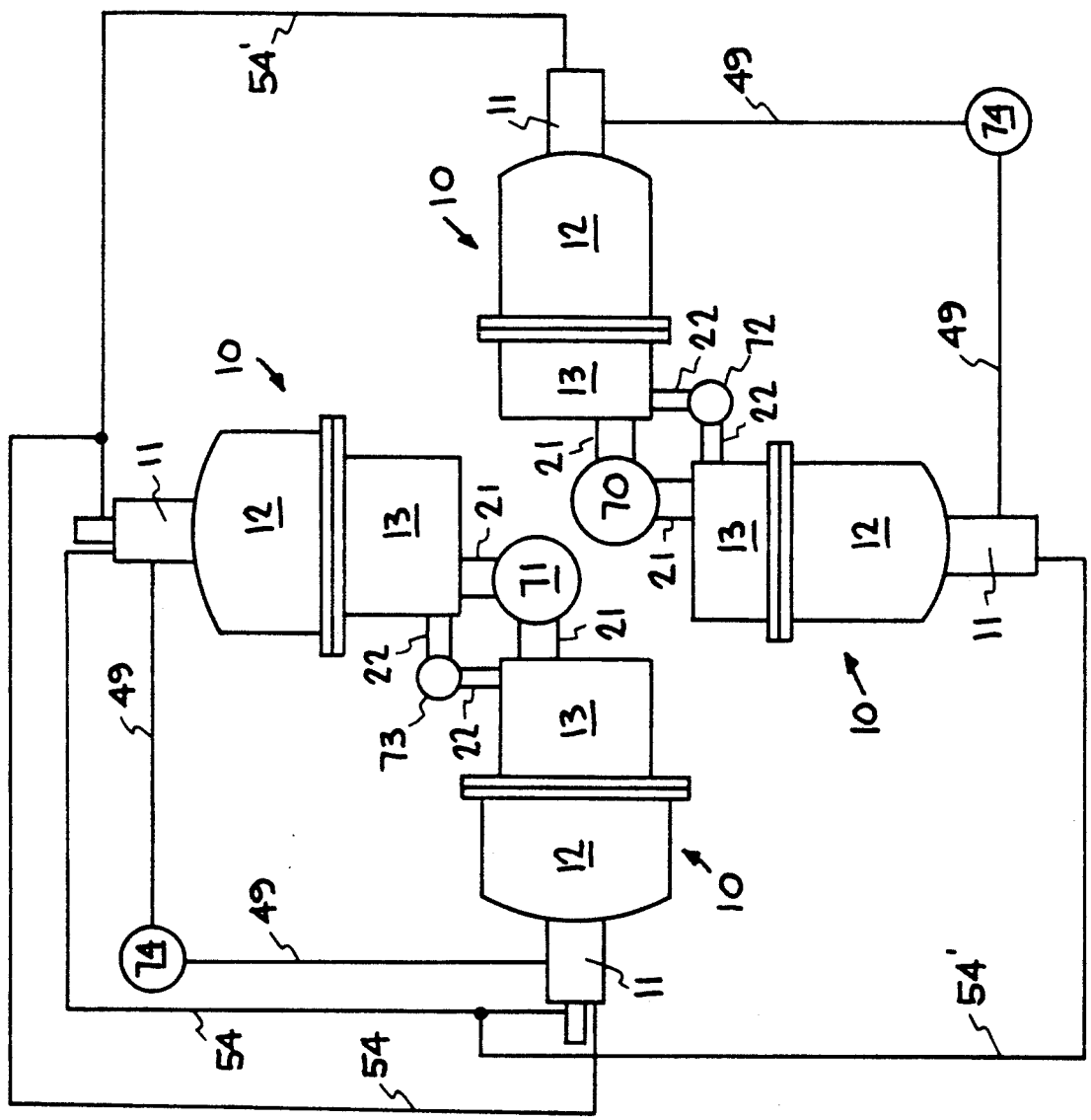
FIG. 6 illustrates an embodiment of the invention for bipropellant applications.

While the application of the invention illustrated in FIG. 5 is directed to a monopropellant liquid propulsion system, FIG. 6 schematically illustrates an embodiment of a bipropellant liquid propulsion system utilizing two pairs of pump/control valve assemblies of the invention. Similar reference numerals for corresponding components of FIGS. 2–4 are utilized in FIG. 6. As shown in FIG. 6 the liquid inlets 21 to the liquid cylinders 13 of pump assemblies 10 are connected to either a low pressure oxidizer storage tank 70 or to a low pressure fuel tank 71, while liquid outlets 22 from cylinders 13 are connected to either a high pressure oxidizer plenum 72 or to a high pressure fuel plenum 73. The oxidizer and fuel plenums 72 and 73 are adapted to be connected to a thrust chamber, not shown, in which the oxidizer and fuel are burned, as known in the propulsion art. Each oxidizer pump assembly is slaved to a fuel pump assembly via interconnected valve assemblies. The valve assemblies 11 are connected via supply lines 49 to a pair of high pressure hot gas generators 74 (could be a single generator connected to both sets of pumps) for activating the gas cylinders 12 of pump assemblies 10, with the valve assemblies being controlled via signal lines 54, as described above with respect to the FIG. 4 embodiment. The oxidizer pump assemblies are slaved to the fuel assemblies via control liens 54' which are connected to signal lines 54. It is thus seen that the four pump assemblies of FIG. 6 enables continuous flow of both fuel and oxidizer liquids. An additional feature of the bipropellant system of FIG. 6 is that the control valve assemblies of the oxidizer pump assemblies do not require the signal valving (valve 37 of FIG. 3) since they only receive pressure signals and do not need to send any. In the FIG. 6 embodiment, vibration is mostly cancelled since opposite pumps stroke towards each other simultaneously. Also, the oxidizer pumps are sized so that the fuel pumps switch control pressures before the oxidizer pumps hit the end of their strokes. This feature is illustrated in FIG. 6 by the difference in size of the pump assemblies 10 connected to oxidizer supply 70 compared to the size of the pump assemblies 10 connected to fuel supply 71.

It has been determined that oxidizer pumps in bipropellant systems, such as utilized in the FIG. 6 embodiment, do not need to have a pressure boost ratio needed for fuel pumps (see ratio set forth above relative to the different cylinder diameters of the pump assembly of FIG. 2). Thus, the oxidizer pump may be lighter in weight and less costly. Since a differential area piston is thus not required, the oxidizer pumps can be made with a single bellows and no sliding seals. This is of particular importance because leakage past sliding seals is unacceptable in the case of oxidizer pumps, because if oxidizer leakage mixes with hot gas leakage from the gas cylinder section of the pump, combustion could result.

Figure 7:
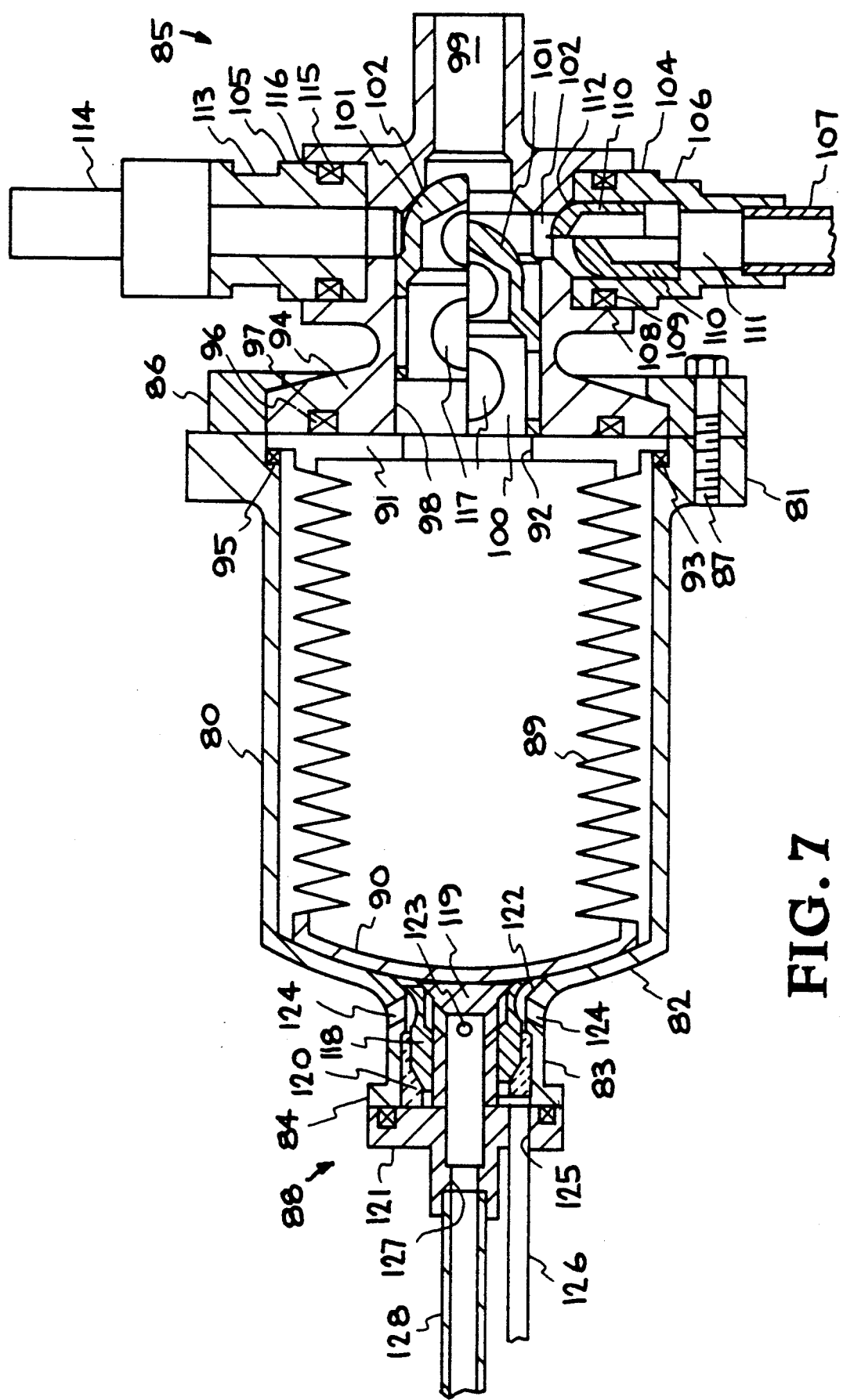
FIG. 7 is a cross-sectional view of an embodiment of an oxidizer pump for the bipropellant system of FIG. 5.

FIG. 7 illustrates an embodiment of an oxidizer pump to replace the free-piston type oxidizer pumps of the bipropellant liquid propulsion system of FIG. 6 the pump of FIG. 7 involves the use of a single metal bellows and no sliding seals. The pump comprises a cylinder or housing 80 having an open end with an outwardly extending flange 81 at said open end, and a partially closed end 82 having a protruding hollow section 83 which terminates in a flange 84. A liquid valve assembly generally indicated at 85 is connected to the open end of cylinder 80 via flange 81, a ring 86 and bolts 87. A warm gas valve assembly generally indicated at 88 is mounted in and secured to the protruding hollow section 83 of cylinder 80 via flange 84 by bolts, not shown.

Located within cylinder 80 and intermediate valve assemblies 85 and 88 is a bellows or piston-like member 89 having a partially curved head member 90 at one end adjacent to the partially closed end 82 of cylinder 80 and a plate 91 having a central opening 92 therein at the opposite end adjacent to he open end of cylinder 80. Plate 91 is secured in a cutaway section 93 of flange 81 by a valve body 94 of valve assembly 85 via ring 86 and bolts 87. A seal 95 is located between plate 91 and cutaway section 93 of flange 81, and a seal 96 is located between plate 91 and valve body 94, being mounted in a groove 97 in valve body 94. Valve body 94 includes a central opening 98 of different diameter sections in communication at one end with opening 92 of plate 91 and which terminates an outwardly extending tube-like section 99 of valve 94. Located in opening 98 of valve body 94 is a check valve 100 which is shown in a half-open, half closed configuration. Note that the check valve 100 is constructed to cooperate with the different diameter sections of central opening 98. Check valve 100 includes a curved end section 101 which when in closed position as shown on the left half of the valve end section 101 abuts a section 102 of central opening 98, such that section 102 forms a seat for valve 100. Thus, when valve 100 is moved toward plate 91 there is open communication between tube 99 and central opening 98 as shown by the right half, but when moved away from plate 91 the communication is shut off.

Valve body 94 is provided with an opening 103 which transverses central opening 98 and has outer enlarged sections 104 and 105. A check valve assembly 106 is mounted in enlarged section 104 and is secured to a tube or line 107. A seal 108 is mounted in a groove 109 in valve assembly 106 to prevent leakage thereby, and a check valve 110 is operably mounted in an opening 111 in valve assembly 106, valve 110 having a curved end which when closed is in abutment with a surface 112 interconnecting openings 103 and 104 which forms a seat for check valve 110. Note that check valve 110 is illustrated in a half-open, half closed configuration. As seen, when check valve 110 is open (shown on left or lower half) there is fluid communication between central opening 98 and tube 107, and when check valve 100 is also open (shown on right half) there is communication between tubes 99 and 107 as indicated by the flow arrows. A coupling 113 having an opening therethrough is mounted in enlarged section 105 of transverse opening 103 and is secured to a pressure transducer 114 which will always see the pressure inside the bellows 89. In normal use the pressure transducer 114 could be eliminated. A seal 115 is mounted in a groove 116 in coupling 113 for preventing leakage thereby. When check valve 100 is in closed position (left half as shown) coupling 113 is in communication with central opening 98, opening 92 and the interior of bellows 89 via holes or openings 117 in check valve 100. When check valve 100 is in open position (right half as shown) communication is maintained via openings 117 between the interior of bellows 89 and pressure transducer 114 via coupling 113. As pointed out above, unless there is a need to know the pressure within bellows 89, the pressure transducer 114 can be eliminated.

Valve assembly 88 is basically a modified version of valve assembly 11 of FIG. 3, comprises a pair of valve members 118 and 119, generally similar to members 39 and 43 of the FIG. 3 embodiment, mounted within a graphite seal 120, with valve member 119 having a central opening and secured to a valve body 121 which is secured to flange 84. The right half of valve member 118 is shown in open position while the left half thereof is shown in closed position wherein a surface of the valve member 118 abuts with a surface 122 of cylinder head or partially closed portion 82 forming a seat for valve 118. Valve member 119 is provided with a plurality of transverse openings 123 and protruding section 83 is provided with a plurality of opening 124. Valve body 121 is provided with an opening 125 connected to a tube or line 126, and a central opening 127 to which is connected a tube or line 128.

In operation of valve assembly 88 of FIG. 7 a warm gas supply, such as supply line 49 in FIG. 3, would be connected to line 128 and a control line, such as line 54' in FIG. 6, would be connected to line 126. Activation of valve assembly 88 by venting line 126 allow warm gas under pressure to pass by valve member 118 in to cylinder 80 and against head 90 of the bellows 89 thereby compressing the bellows (moving the bellows upwardly as shown) which causes liquid within the bellows 89 to be pressurized and forced against check valve 110 causing same to one such that liquid under pressure is passed through line 107. Prior to completion of the stroke of bellows 89, the valve assembly 88 is deactivated by pressure in control lien 126 such that gas from cylinder 80 is exhausted via openings 124 which allows the bellows to expand and refill with liquid. Note that, as shown in FIG. 6, the oxidizer pump is sized so that the fuel pump switches control pressures before the oxidizer pump hits the end of its stroke.

The valve assembly 88 of the FIG. 7 embodiment may be replaced with a valve assembly of the type illustrated in FIG. 3 embodiment, wherein the signal valve stem is connected to the curved head member 90 of the bellows 89 in FIG. 7.

Figure 8:
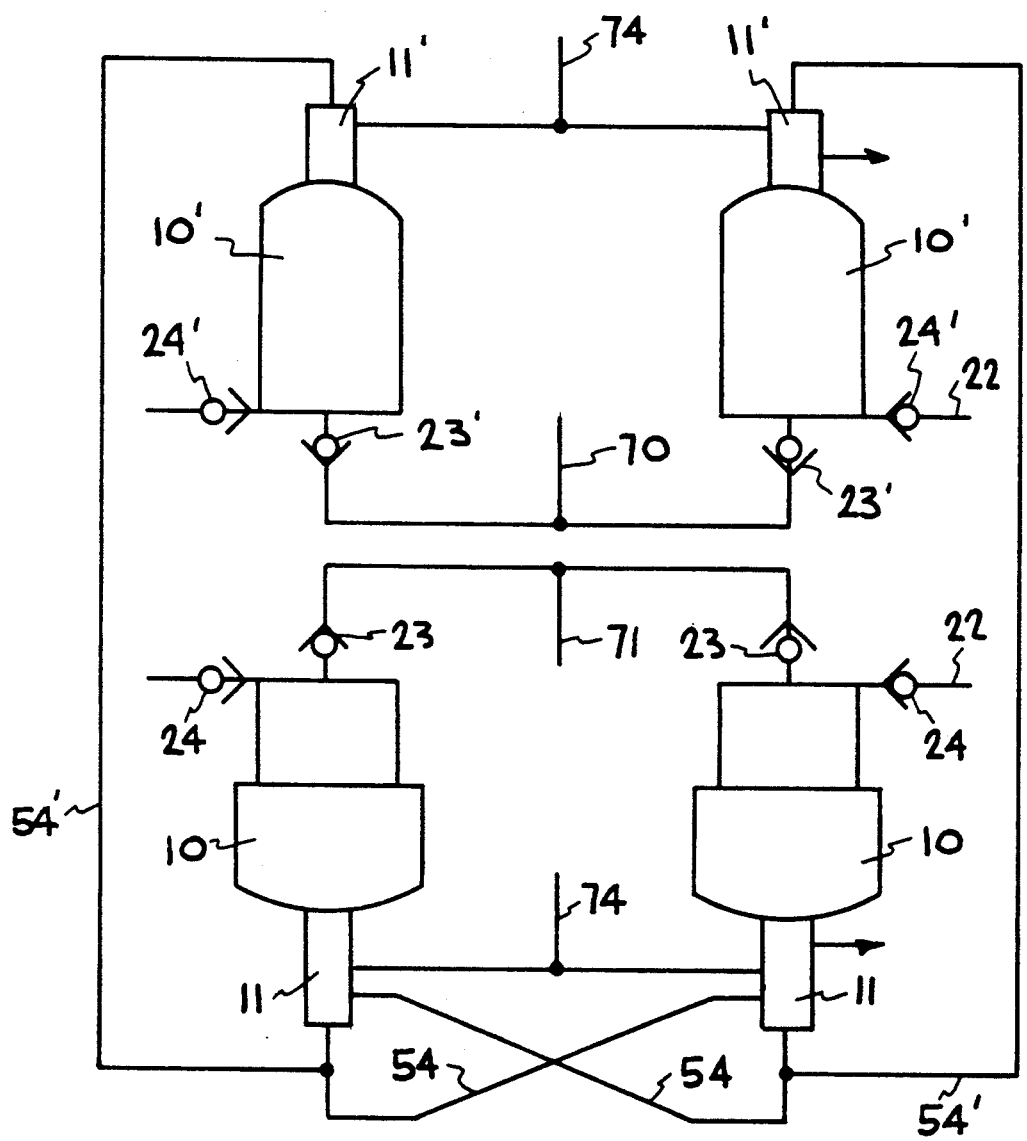
FIG. 8 is a schematic illustration of another embodiment of a bipropellant application utilizing a pair of free-piston pumps and a pair of bellow type pumps.

Referring now to FIG. 8, there is schematically illustrated an embodiment of a bipropellant liquid propulsion system similar to that illustrated in the FIG. 6 embodiment except that the oxidizer pumps are of a bellows type, such as illustrated in the FIG. 7 embodiment. Similar components are indicated by similar reference numerals. As shown, the FIG. 8 embodiment generally comprises a pair of free-piston pump assemblies 10 and associated three-way valve assemblies 11 interconnected as illustrated in FIG. 4, and a pair of bellows type pump assemblies 10' and associated valve assemblies 11', with the pump assemblies 10' being similar to the bellows pump of FIG. 7 and the valve assemblies 11' being similar to the valve assembly 88 of FIG. 7. As pointed out above with respect to the FIG. 6 embodiment, the oxidizer pump assemblies 10' do not need to have a pressure boost ratio as needed for the fuel pump assemblies 10, and the valve assemblies 11' do not require the signal valve of valve assemblies 11. As in FIG. 6 embodiment, each oxidizer pump assembly 10' is slaved to a fuel pump assembly 10 via a pneumatic tube 54'. As in the FIG. 6 embodiment, vibration is mostly cancelled by the oppositely located pump strokes.

It has thus been shown that the present invention provides a unique control valve arrangement which is particularly adapted for systems using fluid-driven pumps, with the pump/valve assembly being operable in pairs wherein the control valve of one pump/valve assembly is switched by a pressure signal depending on the state of the piston of the other pump/valve assembly. Also, it has been shown how the present invention is applicable to liquid and bi-liquid applications, using either free-piston or bellows type pumps, so as to provide continuous liquid pumping of both liquids, as well as providing a modification for one of the liquid pumps.

While the invention has been described primarily in monopropellant and bipropellant liquid propulsion systems, it is not intended to limit the use of the invention to these particular systems. The invention can be utilize for various liquid and gas systems particularly those requiring storage at a low pressure and requiring a higher pressure at the point of use, as well as for pressurizing a plenum or operating an oscillating mechanism. Also, for certain applications diaphram type pumps can be utilized.

While particular embodiments of the invention have been described and illustrated, such is not intended to limit the invention, since other embodiments and applications will become apparent to those skilled in the art. The invention is intended to be limited only by the scope of the appended.

We claim:

1. A system for providing either an on demand supply or a continuous supply of liquid to a point of use comprising:
   at least one pair of fluid-driven pump assemblies;
   each of said pump assemblies including a liquid cylinder section, a fluid cylinder section, a piston located in said liquid and fluid cylinder sections, and inlet and outlet valve means operatively connected to said liquid cylinder section;
   at least a pair of valve assemblies, each operatively connected to a fluid cylinder section of one of said pump assemblies;
   each of said valve assemblies including means for directing fluid into said fluid cylinder section and onto one side of said piston of a pump assembly and for exhausting fluid from said fluid cylinder section and from said one side of said piston of said pump assembly, signal means attached to said one side of said piston of said pump assembly, and means for activating said fluid directing and exhausting means; and
   means interconnecting said signal means and said activating means of an associated pair of said valve assemblies;
   whereby each of said valve assemblies of an associated pair is activated by the location of said piston and the state of pressurization of a pump assembly operatively connected to the other of said valve assemblies of an associated pair.

2. The system of claim 1, wherein said piston of each of said pump assemblies comprises a differential area piston includes a first head, a second head, and a shaft interconnecting said first and second heads;
   said first head being located in said fluid cylinder section and being of a greater cross-section than said second head;
   said signal means of said associated valve assembly being connected to said first head;
   said second head being located in said liquid cylinder section and seal means being connected to the periphery of each of said first and second heads.

3. The system of claim 2, wherein said first head includes an outwardly curved end section, and said second head includes an outer flat end section.

4. The system of claim 1, wherein said liquid cylinder section and said fluid cylinder section of each of said pump assemblies constitute separate cylinders of different cross sections and are interconnected at adjacent ends thereof via a flanged section of each cylinder;
   said valve assembly being attached to a head of said fluid cylinder located at an end opposite said flanged section thereof such that there is no reduction in working volume of said fluid cylinder.

5. The system of claim 4, wherein said liquid cylinder is provided with a head located at an end opposite said flanged section and within which said inlet and outlet valve means are located.
   said inlet and outlet valve means comprising inlet and outlet check valve assemblies;
   said inlet check valve assembly being constructed and mounted to control liquid entering said liquid cylinder from an associated low pressure liquid supply; and
   said outlet check valve assembly being constructed and mounted to control discharge of liquid from said liquid cylinder to a point of use after the liquid has been placed under pressure by said differential area piston.

6. The system of claim 1, wherein said means for directing fluid into said fluid cylinder section of a pump assembly and for exhausting fluid from said fluid cylinder section comprises:
   a hollow first valve member having a head section constructed to cooperate with a surface of a head portion of said fluid cylinder section to define a seat therebetween,
   a second valve member having a central longitudinally extending opening located within said hollow first valve member;
   said second valve member having a head section constructed to cooperate with a surface on aid head section of said first valve member to define a seat therebetween;
   said second valve member being secured at an end opposite said head section to a valve body secured to a hollow protruding section of said head portion of said fluid cylinder section of said pump assembly;
   said second valve member being provided with a plurality of openings locate adjacent to said head section thereof for providing fluid communication between said central opening therein and an outer surface thereof;
   said hollow protruding section of said head portion of said fluid cylinder section being provided with a plurality of openings located adjacent to said surface defining the seat for said first valve member;

said valve body having a central longitudinally extending opening in fluid communication with said central opening in said second valve member, an opening extending from said central opening to an outer surface of said valve body, and a passageway terminating adjacent an end of said first valve member opposite said head section thereof;

said signal means extending through said central opening in said second valve member and into said central opening in said valve body;

a first seal means located intermediate said first valve member and said protruding section of said head portion of said fluid cylinder;

a second seal means located intermediate said first valve member and said second valve member;

a third seal means located in said head section of said second valve member and extending around said signal means extending therethrough; and a fourth seal means located in said central opening in said valve body and around said signal means;

wherein, with said hollow first valve member being located in a seated position on said surfaces of said head portion of said fluid cylinder section, said second valve member is in an unseated position with respect to said surface on said first valve member, such that said fluid cylinder section is in fluid communication with said central openings in said second valve member and said valve body and with said opening in said valve body, whereby fluid under pressure form an associated source can be directed into said fluid cylinder section for moving said piston away from said head portion of said fluid cylinder section and applying pressure to liquid located in said liquid cylinder section and causing the liquid to discharge through said outlet valve means connected to said liquid cylinder section to a point of use; and wherein, with said hollow first valve member being located in an unseated position with respect to said surface on said head portion of said fluid cylinder section, said second valve member is in a seated position with respect to said surface on said first valve member, such that said fluid cylinder section is in fluid communication with said plurality of openings in said hollow protruding section of said head portion of said fluid cylinder section, whereby fluid in said fluid cylinder section can be exhausted via said plurality of openings thereby allowing said piston to move toward said head portion and allowing liquid to enter said liquid cylinder section via said liquid inlet valve means connected to said liquid cylinder section.

7. The system of claim 6, wherein said signal means, connected to said piston and extending through said central opening in said second valve member and into said central opening of said valve body, comprises:

a hollow stem connected at one end to said piston and closed at the opposite end thereof;

said stem being provided with a plurality of opening located adjacent to each end thereof;

wherein said valve body is provided with a second opening extending from said central opening to an outer surface thereof; and a tube connected to one end to said valve body so as to be in fluid communication with said second opening therein, said tube being connected at an opposite end thereof to a passageway in a valve body of an associated valve assembly, said passageway terminating adjacent and end of a hollow first valve member opposite a head section thereof locate in an associated valve assembly;

whereby fluid form a fluid cylinder section of one of a pair of pump assemblies is directed via said signal means against a first valve member of a valve assembly connected to a second pump assembly of a pair of pump assemblies, such that the valve assembly connected to one of said pump assemblies is activated by the location of said piston in another of a pair of pump assemblies via movement of said hollow stem by said piston.

8. The system of claim 7, wherein said valve assembly additionally includes an end cap secured to an outer end of said valve body, said end cap having at least a vent hole therein;

wherein said hollow stem is closed at said opposite end by a plug-like member; and wherein said fourth seal means includes a first end section in sealing contact with said hollow stem, a second end section located intermediate said end cap and said valve body, and an intermediate section in sealing contact with plug-like member, forming a space around a section of said hollow stem, and having an opening therein, said opening being in alignment with said second opening in said valve body, whereby fluid may pass through said hollow stem through said plurality of opening in said hollow stem, through said openings in said fourth seal means and said valve body; or when said hollow stem is moved inwardly by said piston, fluid may pass form an associated valve assembly through said tube, through said opening in said valve body, through said opening in said fourth seal mean, and out through said vent hole in said end cap, thereby venting an associated valve assembly.

9. A liquid pumping system comprising:

a pair of fluid-driven reciprocating pump assemblies; and a pair of fluid activated valve assemblies operatively connected to each of said pump assemblies;

said valve assemblies being interconnected such that stroking of one of the pair of pump assemblies causes activation of the valve assembly connected to the other of the pair of pump assemblies;

each of said valve assemblies including a signal means attached to a piston-like member in said pump assembly on which said valve assembly is mounted;

whereby stroking of said piston-like member in one of said pump assemblies activates said signal means, which activates said valve assembly of the other of said pump assemblies.

10. The liquid pumping system of claim 9, wherein each of said valve assemblies comprises a three-way valve;

said three-way valve includes a first movable valve member, a fixed valve member, and a second movable valve member;

said second movable valve member constituting a portion of said signal means.

11. The liquid pumping system of claim 10, wherein said second movable valve member is hollow and is provided with a plurality of openings adjacent to each end thereof;

one end of said hollow valve member being connected to a piston-like member of one of said pair of pump assemblies, an opposite end of said hollow valve member being closed;

whereby fluid may flow into said hollow valve member through said plurality of openings in one end of said hollow valve member, through said hollow valve member, and out through said plurality of openings in an opposite end of said hollow valve member.

12. The liquid pumping system of claim 10, wherein said first movable valve member is hollow and includes a head section, said head section being constructed to form a seat with a surface of a cylinder head of said pump assembly to which said valve assembly is mounted.

13. The liquid pumping system of claim 10, wherein said fixed valve member and said first and second movable valve members are concentrically located and said valve member extends through an opening in said first movable valve member and includes a head section and a central opening extending longitudinally therethrough, said head section being constructed to form a seat with a surface of said first movable valve;

said second movable valve member extending through said central opening in said fixed valve member.

14. The liquid pumping system of claim 10, additionally including a plurality of seals:
a first of said seals being positioned around said first movable valve member;
a second of said seals being located intermediate of said first movable valve member and said fixed valve member;
a third of said seals being located intermediate of said fixed valve member and said second movable valve member;
whereby said valve assembly has alternating layers of metal an seal material for low-friction operation.

15. The liquid pumping system of claim 14, wherein said plurality of seals are constructed from high-density graphite.

16. A three-way valve assembly adapted to be connected to a fluid under pressure and to a cylinder having a movable member therein for pressurizing or exhausting the cylinder, comprising:
a first movable valve member;
a second movable valve member;
a fixed valve member;
a housing having an opening extending therethrough and in which said valve members are located; and
a plurality of seals between said housing and certain of said valve members and intermediate certain of said valve members, such that there is a seal adjacent to each movable valve member;
said second movable valve member being adapted to be connected to a movable member located within a cylinder being pressurized and exhausted.

17. The three-way valve assembly of claim 16, wherein first movable valve member is hollow and includes a head section, said head section being constructed to form a seat with a surface of said housing;
wherein said fixed valve member extends through said first movable valve member and includes a head section and a central opening therethrough and a plurality of opening adjacent to said head section and connected to said central opening, said head section being constructed to form a seat with a surface of said first movable valve member;
wherein said second movable valve member extends through said central opening in said fixed valve member, and is hollow and provided with a plurality of openings adjacent each end thereof, one end of said second movable valve member being adapted to be connected to a movable member located in a cylinder being pressurized and exhausted, and an end of said second movable valve member being closed; and
wherein said housing includes a plurality of openings located adjacent to said head section of said first movable valve member, an opening in fluid communication with said central opening in said fixed valve member, and an opening in fluid communication with said second movable valve member.

18. The three-way valve of claim 16, wherein said plurality of seals comprises:
a first seal located intermediate said first movable valve member and said housing;
a second seal located intermediate said first movable valve member and said fixed valve member;
a third seal located intermediate said fixed valve member and said second movable valve member; and
a fourth seal located intermediate said second movable valve member and said housing.

19. The three-way valve assembly of claim 18, wherein said plurality of seals are constructed from high density graphite.

20. The system of claim 1, in combination with a monopropellant liquid propulsion system, said system including:
a low-pressure liquid propellant storage tank connected to said inlet valve means of said liquid cylinder sections of said pair of fluid-driven pump assemblies;
a heated fluid generator connected to said pair of valve assemblies for supplying heated fluid to said fluid cylinder sections of said pair of fluid-driven pump assemblies; and
means for directing and controlling liquid propellant pressurized by said pump assemblies to a thrust chamber of the propulsion system.

21. The system of claim 1, in combination with a bipropellant liquid propulsion system utilizing a liquid fuel and a liquid oxidizer, said system including:
two pairs of said fluid-driven pump assemblies;
two pairs of said valve assemblies, each pair of valve assemblies operatively connected to respective pairs of said pump assemblies;
one of each pair of said pump assemblies being operatively connected to a low pressure liquid fuel supply;
one of each pair of said pump assemblies being operatively connected to a low pressure liquid oxidizer supply;
each pair of said valve assemblies being operatively connected to a high pressure fluid supply;
whereby said two pairs of pump assemblies provide a continuous flow of both liquid fuel and liquid oxidizer to a point of use.

22. The combination of claim 21, wherein one pair of said two pairs of pump assemblies comprise fluid-driven free-piston pumps, and another pair of said two pairs of pump assemblies comprise fluid-driven bellows pumps; and wherein said free-piston pumps are operatively connected to said fuel supply, and said bellows pumps are operatively connected to said oxidizer supply.

23. The propulsion system of claim 22, wherein pairs of said pump assemblies are positioned in an opposing relationship such that vibration caused by the stroking action thereof is reduced.

24. The propulsion system of claim 22, wherein each of said pair of said fluid-driven bellows pumps is slaved to one of said pair of fluid-driven free-piston pumps.

25. In a propulsion system utilizing a liquid fuel and a liquid oxidizer, the improvement comprising:
 two pairs of fluid-driven pump assemblies each having a movable member therein;
 two pairs of valve assembles operatively connected to respective pairs of said pump assemblies;
 each of said valve assemblies including a member connected to a movable member of a respective pump assembly;
 one of each pair of said pump assemblies being operatively connected to a low pressure liquid fuel supply;
 one of each pair of said pump assemblies being operatively connected to a low pressure liquid oxidizer supply;
 each pair of said valve assemblies being operatively connected to a high pressure fluid supply;
 at least said valve assemblies which are connected to said pump assemblies and connected to said liquid fuel supply including means for activating one of said pump assemblies in response to a stroking condition of another of said pump assemblies;
 whereby said two pairs of pump assemblies provide a continuous flow of both liquid fuel and liquid oxidizers to a point of use.

26. The propulsion system of claim 25, wherein said pump assemblies connected to said liquid oxidizer supply are selected from the group consisting of fluid-driven free-piston type and fluid driven bellows type.

27. An apparatus for alternately pressurizing and exhausting a pair of chambers with positive pressurization overlap, comprising:
 means defining first and second chambers being movable members therein;
 a source of pressurized fluid;
 a first intake-exhaust valve connected to said first chamber and to said source, and having a first control port, said first chamber receiving pressurized fluid from said source when said first control port is vented, and said first chamber being exhausted when said first control port is pressurized;
 a second intake-exhaust valve connected to said second chamber and to said source, and having a second control port, said second chamber receiving pressurized fluid from said source when said second control port is vented, and said second chamber being exhausted when said second control port is pressurized;
 a first signal valve connected to said movable member in said first chamber, to said second control port and including a first means for indicating the quantity of said pressurized fluid in said first chamber, said first signal valve normally providing a fluid passageway from said first chamber to said second control port, and venting said second control port when said first chamber is substantially full of said pressurized fluid; and
 a second signal valve connected to said movable member in said second chamber to said first control port, and including a second means for indicating the quantity of said pressurized fluid in said second chamber, said second signal valve normally providing a fluid passageway from said second chamber to said first control port, and venting said first control port when said second chamber is substantially full of said pressurized fluid.

28. The apparatus of claim 27, wherein said first and second indicating means comprise first and second movable hollow rods attached to said movable members located within said first and second chambers, respectively.

29. The apparatus of claim 27, wherein each of said intake-exhaust valves comprises an annular poppet moving within concentric intake and exhaust valve seats along a wall of said chamber, whereby non-working volume in said chamber is eliminated and large intake-exhaust flow passageways are provided with a minimum mass and size.

30. The apparatus of claim 29, wherein said signal valves are concentric with said annular poppets.

31. The apparatus of claim 27, wherein each of said first and second chambers is located within a cylinder, and each of said first and second intake-exhaust valves is connected to a head of a respective cylinder.

32. The apparatus of claim 27, wherein each of said first and second chambers constitute a driving chamber of first and second pumps, said first and second pumps being connected at each others pumping outlets, whereby a second fluid is continuously or intermittently pumped through said outlets depending on a downstream demand for the second fluid.

33. The apparatus of claim 32, wherein said source of pressurized fluid is a gas generator in a propulsion system and said second fluid is a propulsion propellant, whereby pump-fed thrust-on-demand operation of a thrust chamber of said propulsion system is made possible.

34. The apparatus of claim 33, wherein each of pumps is also a pressure amplifier, and said gas generator receives said propulsion propellant from said pumps.

35. The system of claim 1, wherein said fluid-driven pump assemblies are each fluid-driven free-piston pumps, and wherein said piston is of a differential area type.

* * * * *